M. TULBOVITCH.
VEHICLE SPRING.
APPLICATION FILED AUG. 25, 1910.

983,097.

Patented Jan. 31, 1911.

Witnesses:

Inventor:
Meyer Tulbovitch
by Harold Serrell
his Atty

UNITED STATES PATENT OFFICE.

MEYER TULBOVITCH, OF NEW YORK, N. Y.

VEHICLE-SPRING.

983,097.

Specification of Letters Patent. Patented Jan. 31, 1911.

Application filed August 25, 1910. Serial No. 578,953.

*To all whom it may concern:*

Be it known that I, MEYER TULBOVITCH, residing at West New Brighton, in the borough of Richmond, city and State of New York, have invented an Improvement in Vehicle-Springs, of which the following is a specification.

My invention relates to springs employed for supporting vehicles upon the axles upon which the vehicle carried is commonly mounted and consists of a device adapted to not only absorb the shock and vibration to which vehicle carriages are subjected, but also to act in such a manner as to prevent excessive vibrations of the vehicle carried and consequently to obviate or prevent the breaking of vehicle springs due to the excessive strains placed upon the same when the vehicle is traveling heavily laden over rough places in the high-way.

I have illustrated my invention in the accompanying drawing, in which—

Figure 1:
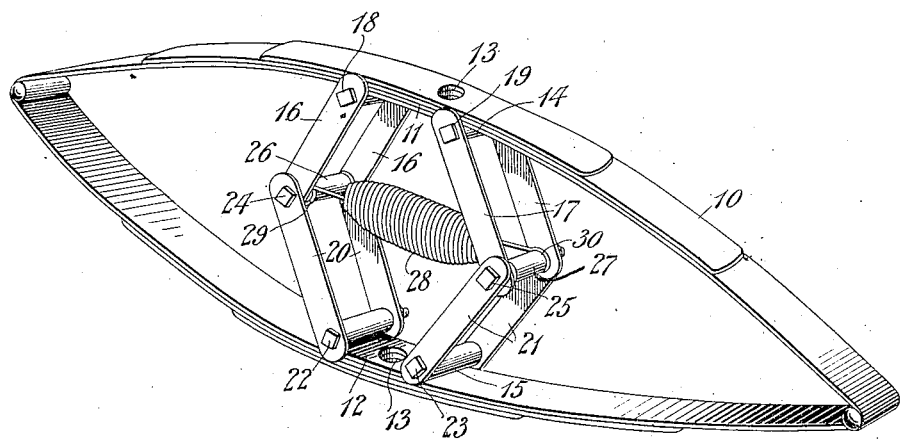
Figure 2:
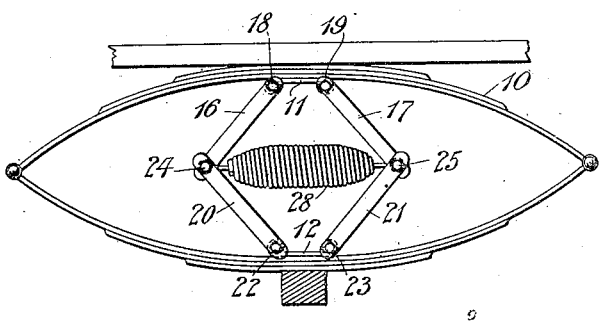
Figure 3:
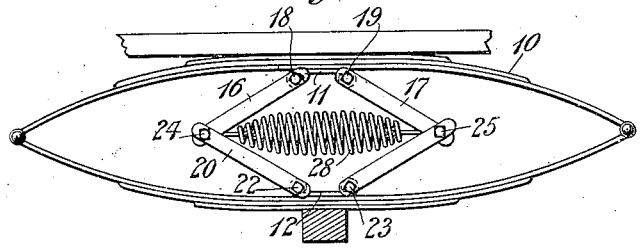

Figure 1 is a perspective view thereof. Fig. 2 is a side elevation showing the vehicle spring in its ordinary normal position, and Fig. 3 is a similar view showing the vehicle spring under compression.

Referring particularly to the drawing, 10 designates the usual elliptical spring commonly employed in vehicles.

11 and 12 are a pair of similarly constructed plates which are secured centrally at diametrically opposite points to the elliptical spring 10 by means of rivets through the openings 13 or otherwise. The ends of the plate 11 are preferably rounded as indicated at 14 to form bearings therein and the ends of the plate 12 are similarly rounded at 15 for a like purpose. These plates 11 12 are illustrated as agreeing in width with the leaves of the spring 10.

16, 17, designate respectively pairs of links. The pair of links 16 at one of their respective ends are pivotally connected to one end of the plate 11 by a bolt or pin 18 passing through these ends of the links and through the adjacent rounded end 14 of the plate 11. Similarly the corresponding ends of the links 17 are pivotally connected to the plate 11 by a bolt or pin 19 passing through these ends of the links 17 and through the adjacent rounded end 14 of the plate. 20 and 21 also indicate respectively, pairs of links; the pair of links 20 being connected to the plate 12 by a bolt or pin 22 and the links 21 being similarly connected to the opposite end of this plate 12 by a bolt or pin 23. The other ends of the links 16 and 20 are pivotally connected by a pin 24 and similarly the other ends of the links 17 and 21 are pivotally connected by a pin 25. Surrounding the pin 24 between the links 16 there is a sleeve 26 and similarly on the pin 25 between the links 17 there is a sleeve 27.

28 designates a spring which is preferably helical but which as will be understood, may being a spring of any desired type, and 29 designates a double ended hook connecting one end of the spring 28 with the pin 24; the loops of the hook passing around the pin between the ends of the sleeve 26 and the adjacent sides of the links 16.

30 designates a double ended hook similar in all respects to the hook 29 and connecting the opposite end of the spring 28 to the pin 25; the loops of the hook 30 passing around the pin 25 between the ends of the sleeve 27 and the adjacent sides of the links 17.

Now as will be understood, in the operation of the hereinbefore described vehicle support, when the elliptical spring 10 is compressed, the members of the connected pairs of links will move toward each other or tend to close and this elongates and applies tension to the spring 28 whereby the spring 28 assists the elliptical spring in carrying the load, and in the recoil of the elliptical spring beyond its normal position, the pairs of links will separate or open and thereby tend to compress the spring 28, with which action this spring 28 assists the elliptical spring 10 to withstand an abnormal re-coil which might be sufficient to break it.

I claim as my invention:

1. A vehicle support comprising an elliptical spring, links in pairs, pins pivotally connecting adjacent ends of said pairs of links, and sleeves between said ends through which such pins pass, means pivotally securing the distant ends of said links to the parts of said elliptical spring outside the planes of its sides and a helical spring between the adjacent ends of the pairs of links secured to their pivotal connection and connecting the links for the application of tension to the spring.

2. A vehicle support comprising an elliptical spring, plates with rounded ends forming bearings secured to the opposite inner faces of the spring at the center, links in pairs, sleeves between adjacent ends of the pairs of links and pins passing through such ends and the sleeves extending between the same, and other pins passing through the distant ends of the pairs of links and through the rounded bearing ends of such plates for connecting such parts together, and a helical spring between the adjacent ends of the pairs of links secured to the first aforesaid pins and connecting the links for the application of tension to the spring.

Signed by me this 18th day of August 1910.

MEYER TULBOVITCH.

Witnesses:
GEO. T. PINCKNEY,
E. ZACHARIASEN.